United States Patent
Govindaraj et al.

(10) Patent No.: US 10,678,848 B2
(45) Date of Patent: Jun. 9, 2020

(54) METHOD AND A SYSTEM FOR RECOGNITION OF DATA IN ONE OR MORE IMAGES

(71) Applicant: WIPRO LIMITED, Bangalore (IN)

(72) Inventors: Balaji Govindaraj, Chennai (IN); Mohd Zaid, Delhi (IN); Sujatha Jagannath, Bangalore (IN); Raghottam Mannopantar, Bangalore (IN)

(73) Assignee: Wipro Limited, Bangalore (IN)

( * ) Notice: Subject to any disclaimer, the term of this patent is extended or adjusted under 35 U.S.C. 154(b) by 135 days.

(21) Appl. No.: 15/936,470

(22) Filed: Mar. 27, 2018

(65) Prior Publication Data

US 2019/0251192 A1      Aug. 15, 2019

(30) Foreign Application Priority Data

Feb. 12, 2018 (IN) .............................. 201841005276

(51) Int. Cl.
*G06F 16/583* (2019.01)
*G06K 9/34* (2006.01)
(Continued)

(52) U.S. Cl.
CPC ........... *G06F 16/5854* (2019.01); *G06K 9/34* (2013.01); *G06N 5/022* (2013.01); *G06N 5/04* (2013.01);
(Continued)

(58) Field of Classification Search
CPC ...... G06F 16/5854; G06K 9/34; G06N 5/022; G06N 5/04; G06T 2207/20081; G06T 2207/20084
See application file for complete search history.

(56) References Cited

U.S. PATENT DOCUMENTS 6,292,792 B1    9/2001   Baffes et al.
7,249,117 B2    7/2007   Estes
(Continued)

FOREIGN PATENT DOCUMENTS

CN    104134078 A    11/2014
CN    106022273 A    10/2016
(Continued)

*Primary Examiner* — Leon Flores
(74) *Attorney, Agent, or Firm* — Finnegan, Henderson, Farabow, Garrett & Dunner, LLP

(57) ABSTRACT

The present disclosure relates to a method and system for recognition of data in one or more images. The method receives and segments the one or more images to identify segmented objects. Further, the method generates an object relationship data for each of the segmented objects and determines a knowledge base representation of the object relationship data based on defined features. Furthermore, a Recurrent Neural Network (RNN) is trained based on the knowledge base representation to determine an appropriate Neural Network (NN) having optimum confidence score. Based on the appropriate NN selected, the objects in the input image is predicted and transmitted to external systems for decision making. Thus, enabling accurate text/object identification for the images having different background variations using the dynamic selection of NN, thereby facilitating more effective decision making.

15 Claims, 6 Drawing Sheets

(51) Int. Cl.
*G06N 5/02* (2006.01)
*G06N 5/04* (2006.01)
(52) U.S. Cl.
CPC ............... *G06T 2207/20081* (2013.01); *G06T 2207/20084* (2013.01)

(56) References Cited

U.S. PATENT DOCUMENTS

| | | | |
|---|---|---|---|
| 9,760,806 B1 * | 9/2017 | Ning | B60W 50/14 |
| 10,013,773 B1 * | 7/2018 | Ogale | G06K 9/00791 |
| 2004/0015906 A1 | 1/2004 | Goraya | |
| 2011/0110596 A1 | 5/2011 | Matsuda et al. | |
| 2019/0057314 A1 * | 2/2019 | Julian | G06N 20/00 |

FOREIGN PATENT DOCUMENTS

| | | |
|---|---|---|
| CN | 106657812 A | 5/2017 |
| WO | 2012050252 A1 | 4/2012 |

\* cited by examiner

METHOD AND A SYSTEM FOR RECOGNITION OF DATA IN ONE OR MORE IMAGES

FIELD OF DISCLOSURE

The present subject matter is related, in general to image processing and more particularly, but not exclusively to a method and a system for recognition of data in images.

BACKGROUND

In current scenario, there are various techniques used for recognizing data such as text, objects in the images desired for a specific application. For example, in the case of automated bill processing systems, data such as bill details shall be recognized and extracted from the images of the bill. The images of the bill will have varying background such as white or color depending on the type of bill and the vendor. Conventional image processing techniques employ one type of approach for extracting the data from images. However, there may be multiple background variations in an image such that a single approach may not be sufficient for reading these varying background format images as each approach may be suitable for a particular background variation. For example, one approach using Open Computer Vision (OpenCV) is suitable for recognizing objects in white background images and another approach using Convolutional Neural Network (CNN) is suitable for images with colored background. Conventional techniques, fail to utilize multiple approaches for images to produce an overall accurate result under a given scenario. Further, conventional techniques fail to accurately determine data in images where there may be multiple background variations in a single image.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Embodiments of the present disclosure relates to a method for recognition of data in images. The method comprises receiving one or more images from an image sensor and segmenting one or more images to identify one or more segmented objects in one or more images. The method further comprises generating an object relationship data for each of the segmented objects, wherein each of the segmented objects comprising one or more defined features and a confidence score. Further, the method comprises determining a knowledge base representation of the object relationship data based on the one or more defined features of the one or more segmented objects. In one aspect, the knowledge base representation comprises one or more defined feature nodes, one or more indent nodes and a plurality of links defining a relationship between the one or more defined feature nodes and at least one indent node. Based on the knowledge base representation, a Recurrent Neural Network (RNN) is trained generating a trained RNN that is capable of determining an appropriate Neural Network (NN) based on selection of the at least one indent node having optimum confidence score and the trained RNN for data prediction and recognition.

Further, the present disclosure relates to a data recognition system for recognition of data in images, comprising at least one image sensor for capturing one or more images. The data recognition system further comprises a processor and a memory communicatively coupled with the processor, wherein the memory stores processor-executable instructions, which on execution cause the processor to receive one or more images from the image sensor. Upon receiving one or more images from the image sensor, the processor segments the one or more images to identify one or more segmented objects and generates an object relationship data for each of the segmented objects. Each segmented object comprises one or more defined features and a confidence score. The processor further determines a knowledge base representation of the object relationship data based on the one or more defined features of the one or more segmented objects. The knowledge base representation comprises the one or more defined feature nodes, one or more indent nodes and a plurality of links defining the relationship between the one or more defined feature nodes and at least one indent node. Further, the processor is configured to train a RNN based on the knowledge base representation to generate a trained RNN and determine an appropriate Neural Network (NN) based on selection of the at least one indent node having optimum confidence score and the trained RNN for data prediction and recognition.

Furthermore, the present disclosure relates to a non-transitory computer readable medium including instructions stored thereon that when processed by at least one processor cause a data recognition system to receive one or more images from the image sensor. The instructions further enable the at least one processor to segment the one or more images to identify one or more segmented objects and generate an object relationship data for each of the segmented objects. Each segmented object comprises one or more defined features and a confidence score. The at least one processor further determines a knowledge base representation of the object relationship data based on the one or more defined features of the one or more segmented objects. The knowledge base representation comprises the one or more defined feature nodes, one or more indent nodes and a plurality of links defining the relationship between the one or more defined feature nodes and at least one indent node. Further, the at least one processor trains a RNN based on the knowledge base representation to generate a trained RNN and determine an appropriate Neural Network (NN) based on selection of the at least one indent node having optimum confidence score and the trained RNN for data prediction and recognition.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
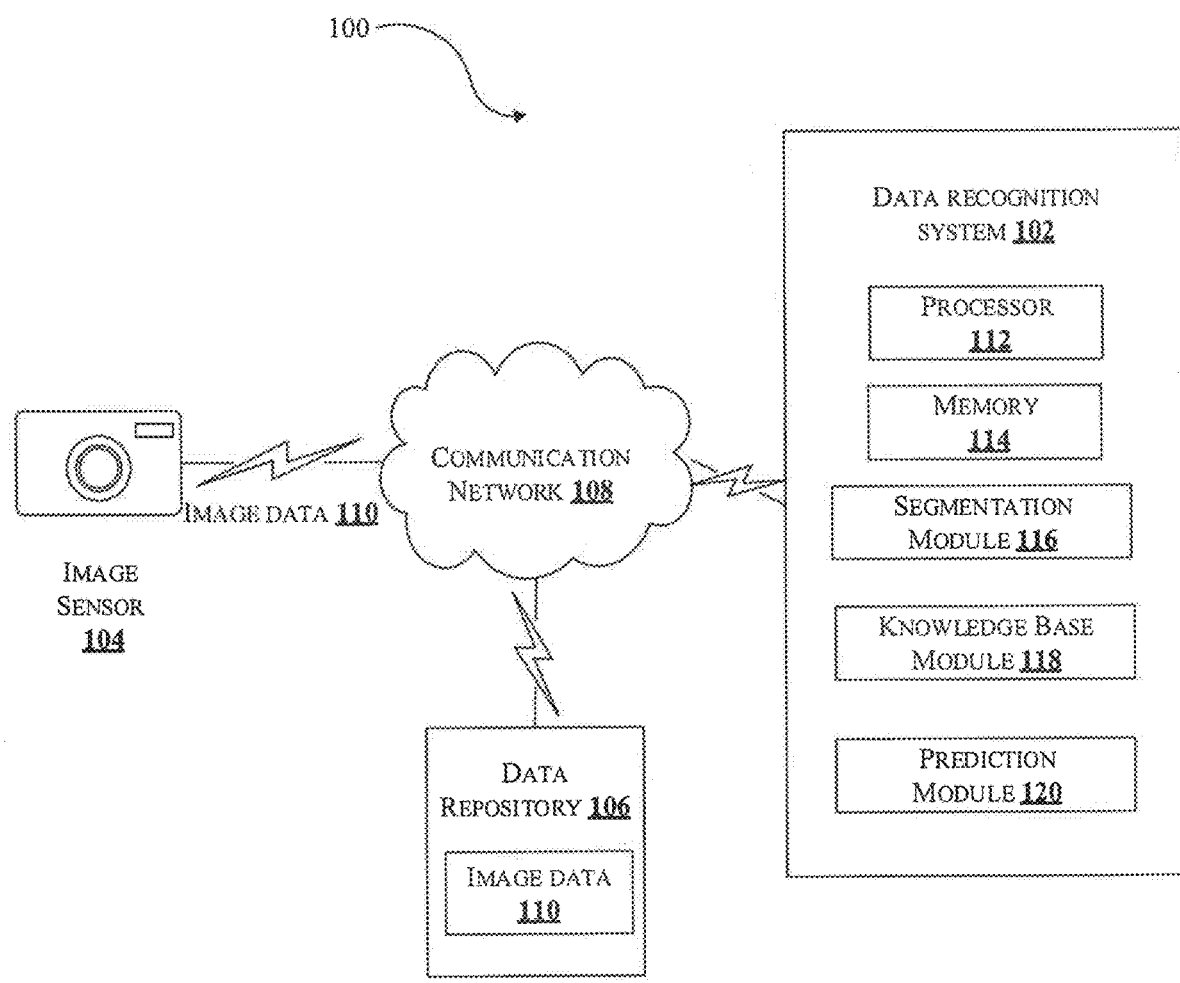
FIG. 1 illustrates an exemplary architecture of a system for recognition of data in images in accordance with some embodiments of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein is a method and system for recognition of data in images received from an image sensor. The method includes segmenting one or more images to identify one or more segmented objects in the one or more images and generating an object relationship data for each of the segmented objects. Each of the segmented objects includes one or more defined features and a confidence score as the object relationship data. Further, a knowledge base representation of the object relationship data is determined based on the one or more defined features of the one or more segmented objects. In one embodiment, the knowledge base representation comprises one or more defined feature nodes, one or more indent nodes and a plurality of links defining a relationship between the one or more defined feature nodes and at least one indent node. Further, a Recurrent Neural Network (RNN) is trained based on the knowledge base representation and an appropriate Neural Network (NN) is determined by the trained RNN based on selection of the at least one indent node having optimum confidence score for data prediction and recognition. The highest confidence score in the object relationship data associated with the at least one indent node is the optimum confidence score. Thus, the present disclosure enables dynamic selection of image processing approach based on the identified scenario for accurate text/object identification for the images and thereby enabling more effective decision making.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture of a system for recognition of data in one or more images in accordance with some embodiments of the present disclosure.

As illustrated in FIG. 1, an exemplary system 100 comprises one or more components configured for recognition of data in images. The exemplary system 100 comprises a data recognition system (hereinafter referred to as DRS) 102, an image sensor 104 and a data repository 106 communicatively coupled via a communication network 108. The communication network 108 may include, without limitation, a direct interconnection, local area network (LAN), wide area network (WAN), wireless network (e.g., using Wireless Application Protocol), the Internet, and the like.

The image sensor 104 may be for example, a camera or any image capturing device mounted on a vehicle or a handheld device to capture one or more images. In one aspect, the image sensor 104 may be oriented perpendicular to the field of view. The image sensor 104 may be capable of capturing one or more images (hereinafter referred to as image data) 110 in any file format such as, but not limiting to, JPG, PNG and other common file formats for images that can be converted to any suitable format before processing the images. The image data 110 may be stored in the data repository 106 coupled with the DRS 102. The image data 110 may be, for example, images of bills in an automated bill processing system. The data repository 106 may be integrated with DRS 102, in one embodiment. In another embodiment, the data repository 106 may be configured as standalone device independent of DRS 102.

The DRS 102 comprises at least a processor 112 and a memory 114 coupled with the processor 112. The processor 112 may be for example, a specialized processing unit, a typical graphics processing unit (GPU) or any other processing unit capable of processing the image data 110 captured by the image sensor 104. The DRS 102 also comprises a segmentation module 116, a knowledge base module 118 and a prediction module 120. The segmentation module 116 is configured to receive the image data 110 captured by the image sensor 104 and segment the image data 110 to identify segmented objects and text in the image data 110. The knowledge base module 118 is configured to generate an object relationship data for each of the segmented objects. Each of the segmented objects comprise at least one of one or more defined features and a confidence score associated with the image data 110. The prediction module 120 is configured to map the defined features with at least one NN having the optimum confidence score. The prediction module 120 selects at least one NN having the optimum confidence score for processing the image data 110. The prediction module 120 is further configured to update the list of NN's by adding new NN in the knowledge base representation 220, thus enabling dynamic selection of NN for data recognition based on given scenario.

Figure 2:
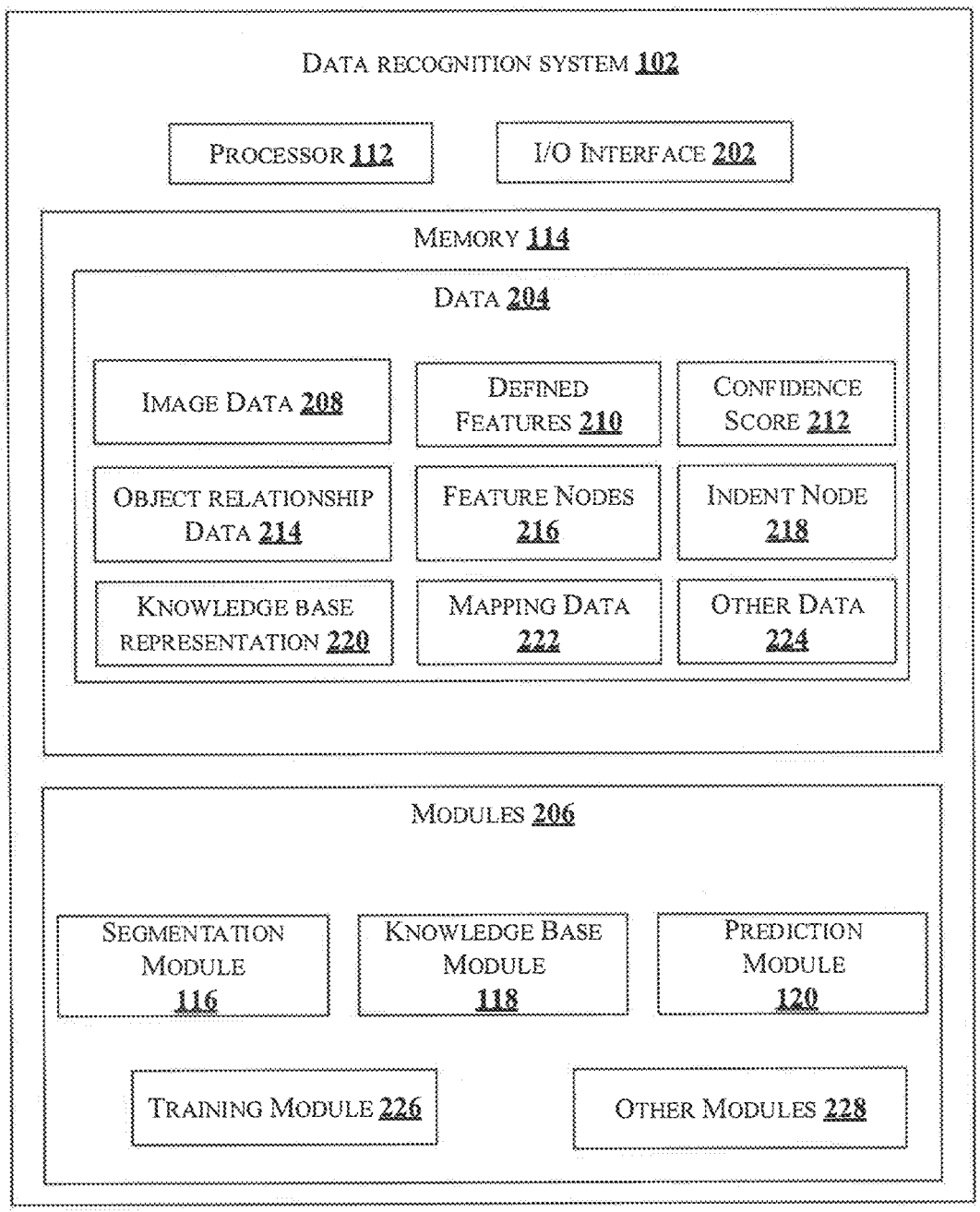
FIG. 2 shows a detailed block diagram of a data recognition system of FIG. 1 in accordance with some embodiments of the present disclosure.

In an embodiment, the DRS 102 may be a typical DRS 102 as illustrated in FIG. 2. The DRS 102 comprises the processor 112, the memory 114 and an I/O interface 202 communicatively coupled with the processor 112. The DRS 102 further includes data 204 and modules 206. In one implementation, the data 204 may be stored within the memory 114. In some embodiments, the data 204 may be stored within the memory 114 in the form of various data structures. Additionally, the data 204 may be organized using data models, such as relational or hierarchical data models. In one example, the data 204 may include image data 208, defined features 210, confidence score 212, object relationship data 214, feature nodes 216, indent node 218, knowledge base representation 220, mapping data 222 and other data 224. The other data 224 may store displacement of data including temporary data and temporary files, generated by the modules 206 for performing the various functions of the DRS 102.

The modules 206 may include, for example, the segmentation module 116, the knowledge base module 118, the prediction module 120 and a training module 226. The modules 206 may comprise other modules 228 to perform various miscellaneous functionalities of the DRS 102. It will be appreciated that such aforementioned modules may be represented as a single module or a combination of different modules. The modules may be implemented in the form of software executed by a processor, hardware and/or firmware.

In operation, the image sensor 104 captures the image data 110 perpendicular to the field of view. The DRS 102 receives the image data 110 captured by image sensor 104 and stores the received image data 110 in the memory 114 as the image data 208. The DRS 102 further analyzes the image data 208 to enable data recognition by segmenting the image data 208 to one or more objects and text.

In one embodiment, the segmentation module 116 segments the image data 208 to identify one or more objects and text in the image data 208. In one aspect, the segmentation module 116 identifies one or more segmented objects based on training of a Fully Convolutional Neural Network (FCNN). The training module 226 receives the image data 110 and enables training of the FCNN with the image data 110 generating one or more trained objects and text data. The segmentation module 116 identifies one or more trained objects and text data in the image data 208 using the trained FCNN. In one embodiment, the segmentation module 116 localizes, draw boundaries, and crop the regions of one of objects and text in the image data 208. The segmentation module 116 generates at least one boundary for the one or more trained objects and text data identified in the image data 208 and crops the identified trained objects and text data along the at least one boundary to determine the one more segmented object data and text data in the image data 208.

The knowledge base module 118 is configured to generate an object relationship data 214 for each of the segmented objects, wherein each of the segmented objects comprise at least one or more defined features 210 and the confidence score 212. The defined features 210 for the segmented object data comprises one or more features associated with the segmented object data, for example object type, object orientation, contrast, and brightness. In another example, the defined features for segmented text data may include angle of text rotation, font color, font size and font style and other related features. In an embodiment, the knowledge base module 118 is configured to generate the object relationship data 214 for each of the segmented objects by training a plurality of NNs with the one or more segmented objects and identifying at least one defined feature 210 for each of the one or more segmented objects. The knowledge base module 118 is further configured to determine the confidence score 212 for the one or more defined features 210 of the one or more segmented objects associated with the plurality of NNs.

Further, the knowledge base module 118 is configured to determine the knowledge base representation 220 of the object relationship data 214 based on the one or more defined features 210 of the one or more segmented objects. The knowledge base representation 220 comprises the one or more defined feature nodes 216, the one or more indent nodes 218 and the mapping data 222 that defines relationship between the one or more defined feature nodes 216 and at least one indent node 218. The defined feature node 216 represents at least one defined feature 210 in the knowledge base representation 220. In one embodiment, the knowledge base module 118 is configured to identify the one or more indent nodes 218 for each segmented object in the object relationship data 214. An indent node represents a NN and the one or more indent nodes 218 represents a list of NNs. Further, the knowledge base module 118 is configured to determine the one or more indent nodes 218 with optimum confidence score 212 associated with each segmented object and perform mapping of the at least one indent node 218 with the one or more defined features 210 generating the link or mapping data 222 between the one or more defined feature nodes 216 and at least one indent node 218. Based on the knowledge base representation 220, the prediction module 120 selects an appropriate NN to recognize the data.

In an embodiment, the prediction module 120 may be a Recurrent NN (RNN), that is trained based on the object relationship data 214. The prediction module 120 selects at least one indent node 218 based on the confidence score 212 of the at least one indent node 218 listed in the object relationship data 214. Further, the prediction module 120 is configured to update the list of NN's by adding new indent node 218 in the knowledge base representation 220. Based on the appropriate indent node 218 selected by the prediction module 120, the objects in the input image data 208 is predicted and transmitted to external systems for decision making. Thus, enabling accurate text/object identification for the images having different background variations using the dynamic selection of NN, thereby facilitating more effective decision making.

Figure 3A:
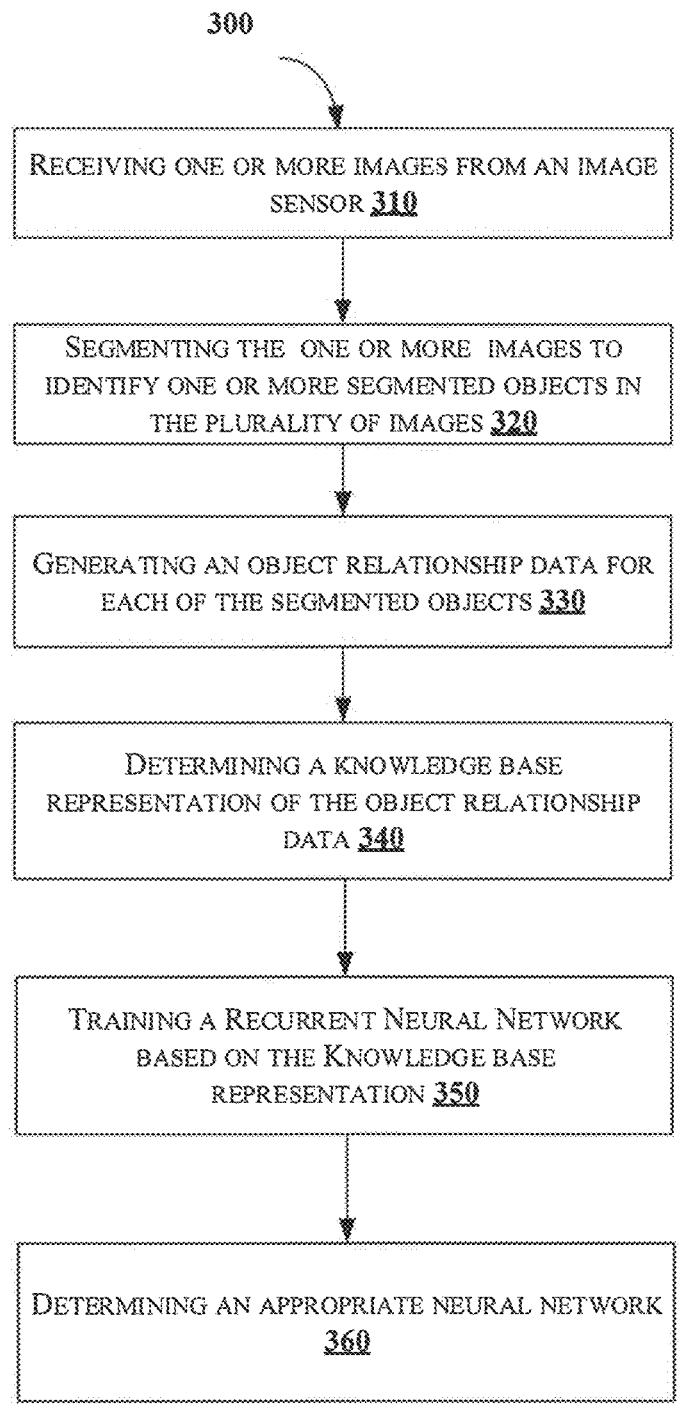
FIG. 3A shows a flowchart illustrating a method for recognition of data in images in accordance with some embodiments of the present disclosure.

FIG. 3A shows a flowchart illustrating a method 300 for recognition of data in images.

As illustrated in FIG. 3A, the method 300 includes one or more blocks illustrating a method of recognition of data in images by the DRS 102. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

Figure 3B:
FIG. 3B illustrates an exemplary input image received from the image sensor of FIG. 1 in accordance with some embodiments of the present disclosure.

At block 310, one or more images from the image sensor is received. In an embodiment, the image sensor 104 captures the image data 110 perpendicular to the field of view. The DRS 102 receives the image data 110 captured by image sensor 104 and stores the received image data 110 in the memory 114 as the image data 208. The DRS 102 further analyzes the image data 208 to enable data recognition. FIG. 3B illustrates an exemplary input image 312 received from the image sensor 104.

Figure 3C:
FIG. 3C illustrates an exemplary segmented data of the input image of FIG. 3B in accordance with some embodiments of the present disclosure.

At block 320, one or more images are segmented to identify one or more segmented objects. In one embodiment, the segmentation module 116 is configured to segment the image data 208 to identify one or more objects and text in the image data 208. In one embodiment, the segmentation module 116 identifies one or more segmented objects based on training of a Fully Convolutional Neural Network (FCNN). In an embodiment, the training module 226 receives the image data 110 and provides training of the FCNN with the image data 110 generating one or more trained objects and text data. The segmentation module 116 identifies one or more trained objects and text data in the image data 208 by using the FCNN. The segmentation module 116 further generates at least one boundary for the one or more trained objects and text data identified in the image data 208 and crops the identified trained objects and text data along the at least one boundary to determine the one more segmented object data and text data in the image data 208. As shown in FIG. 3C, the segmentation module 116 identifies, creates a boundary, and crops the first segmented object "WEST END BOOK CLUB" 322A which is a text with varying background. The segmentation module 116 identifies, creates a boundary, and crops the second segmented object "JOE STRUMMER FAN CLUB" 322B which is a text with plain background.

At block 330, an object relationship data 214 for each of the segmented objects is determined. In an embodiment, the knowledge base module 118 is configured to generate an object relationship data 214 for each of the segmented objects, wherein each of the segmented objects comprise at least one or more defined features 210 and the confidence score 212. In one embodiment, the knowledge base module 118 is configured to generate the object relationship data 214 for each of the segmented objects by training a plurality of NNs with the one or more segmented objects and identifying at least one defined feature 210 for each of the one or more segmented objects. The knowledge base module 118 is further configured to determine the confidence score 212 for the one or more defined features 210 of the one or more segmented objects associated with the plurality of NNs.

TABLE 1

| Sample No | Segment No | Feature List | OpenCV | CNN | FCNN |
| --- | --- | --- | --- | --- | --- |
| 1 | 1 | Object Type: Text Object Orientation: | 0.70 | 0.90 | 0.60 |

TABLE 1-continued

| Sample No | Segment No | Feature List | OpenCV | CNN | FCNN |
| --- | --- | --- | --- | --- | --- |
| 1 | 2 | 0 degrees Background: Colour Contrast: Medium Brightness: High Object Type: Text Object Orientation: 0 degrees Background: None Contrast: High Brightness: High | 0.95 | 0.80 | 0.85 |

An exemplary object relationship data 214 of the segmented objects of the input image 312 as shown in FIG. 3B is illustrated above in Table 1. In this example embodiment, the first segmented object "WEST END BOOK CLUB" 332A is a text with varying background and the second segmented object "JOE STRUMMER FAN CLUB" 332B is a text with plain background. As shown in Table 1, the one or more defined features 210 for first segmented data 322A comprises object type, object orientation, background, contrast, and brightness. The one or more defined features for second segmented data 322B comprises object type, object orientation, background, contrast and brightness. The localized object is sent to a plurality of Neural Networks (NN) for training. Further, when all the NN's are trained, the confidence scores 212 of each NN with respect to each segment of the input image is generated as shown in Table 1.

At block 340, a knowledge base representation 220 of the object relationship data 214 is determined. In an embodiment, the knowledge base module 118 is configured to determine the knowledge base representation 220 of the object relationship data 214 based on the one or more defined features 210 of the one or more segmented objects. The knowledge base representation 220 comprises the one or more defined feature nodes 216, the one or more indent nodes 218 and the mapping data 222 that defines relationship between the one or more defined feature nodes 216 and the one or more indent nodes 218. In one embodiment, the knowledge base module 118 is configured to identify the one or more indent nodes 218 for each segmented object in the object relationship data 214. The indent node 218 represents a NN and the plurality of indent nodes 218 represents a list of NNs. Further, the knowledge base module 118 is configured to determine the one or more indent nodes 218 with optimum confidence score 212 associated with each segmented object and perform mapping of the at least one indent node 218 with the one or more defined features 210 generating the mapping data 222 between the one or more defined feature nodes 216 and the one or more indent nodes 218. The defined feature node 216 represents at least one defined feature 210 in the knowledge base representation 220. Based on the knowledge base representation 220, the prediction module 120 selects an appropriate NN to recognize the data.

Figure 3D:
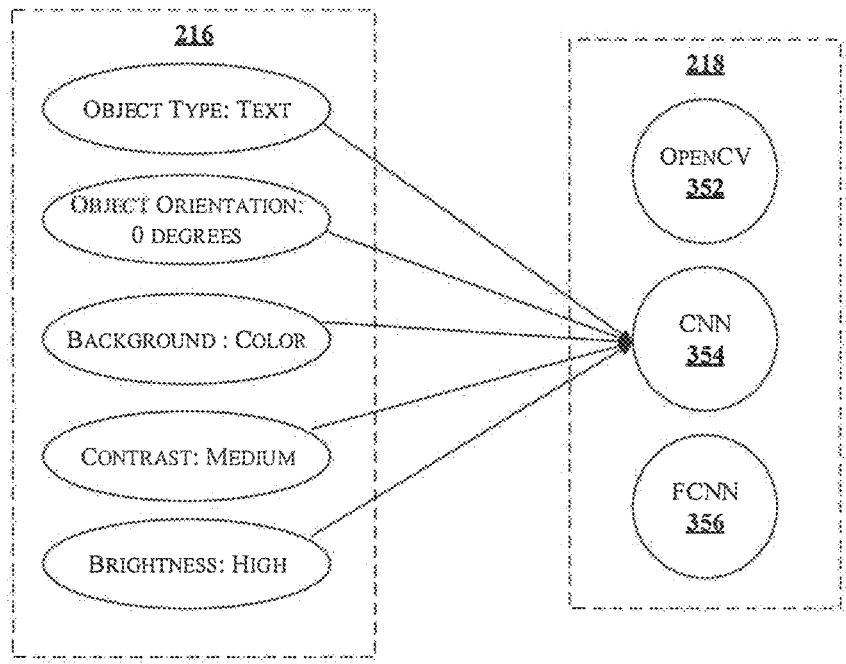
FIGS. 3D and 3E illustrate selection of NN by prediction module in accordance with some embodiments of the present disclosure.
Figure 3E:
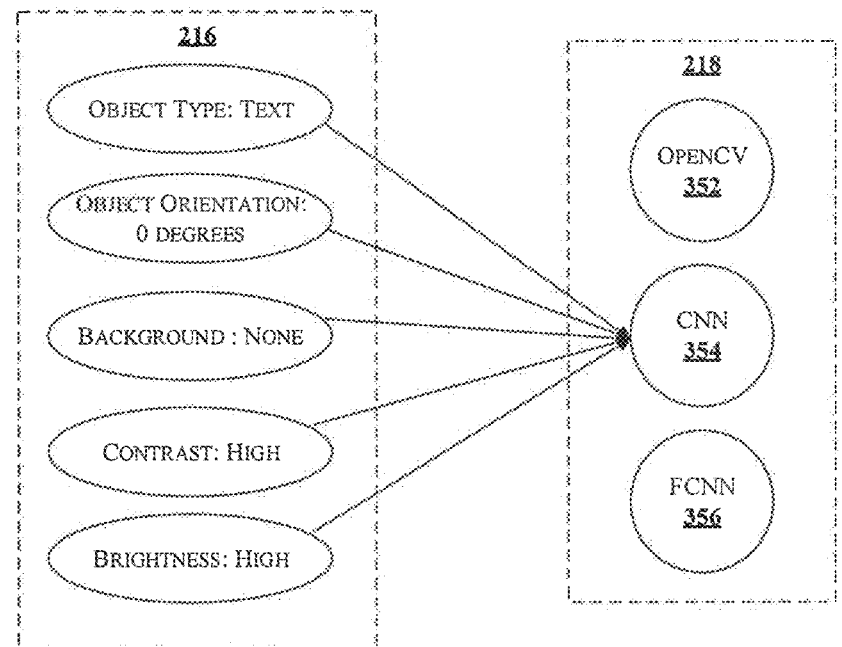

In an example embodiment, the knowledge base representation 220 of the object relationship data 214 based on the one or more defined features 210 of the one or more segmented objects 322A and 322B is respectively shown in FIG. 3D and FIG. 3E. The knowledge base representation 220 in this example embodiment is in the form of a graph data structure. The one or more feature nodes 216 are selected from the list of defined features 210 in the object relationship data 214 in Table 1. Feature nodes 216 helps in identifying the one or more indent nodes 218 based on the mapping data 222 specified in the object relationship data 214 as shown in Table 1. The mapping data 222 between the feature nodes 216 and the one or more indent nodes 218 is derived from the confidence score 212.

At block 350, a Recurrent Neural Network is trained based on the Knowledge base representation 220. In an embodiment, the prediction module 120 may be a Recurrent NN (RNN), that is trained based on the object relationship data 214. The prediction module 120 selects at least one indent node 218 based on the confidence score 212 of the at least one indent node 218 listed in the object relationship data 214. Further, the prediction module 120 is configured to update the list of NN's by adding new indent node 218 in the knowledge base representation 220. In an example embodiment, the data from the Table 1 is used to identify the mapping data 222 between defined features 210 and indent nodes 218. FIG. 3D illustrates the mapping of the first segmented object 322A defined features in the feature node 216 to the one or more indent nodes 218 such as OpenCV 352, CNN 354 and FCNN 356 representing the NN. FIG. 3E illustrates prediction module 120 mapping the second segmented object defined features in the feature nodes 216 to the one or more indent nodes 218 representing the NN.

At block 360, an appropriate neural network is determined. In an embodiment, appropriate NN i.e., the one or more indent node 218 having optimum confidence score 212 is selected by the prediction module 120 for predicting the objects in the input image data 208. For example, for the first segmented data 302A, the prediction module 120 selects the NN having the highest confidence score, i.e. FCNN 356 derived from Table 1. Similarly, for the second segmented data 302B, the prediction module 120 selects the NN having the highest confidence score i.e., OpenCV 352 derived from Table 1. Based on the selected NN, objects and text data are predicted in the image data 208 and transmitted to external systems for decision making. Thus, enabling accurate text/object identification for the images having different background variations using the dynamic selection of NN, hence facilitating more effective decision making.

Figure 4:
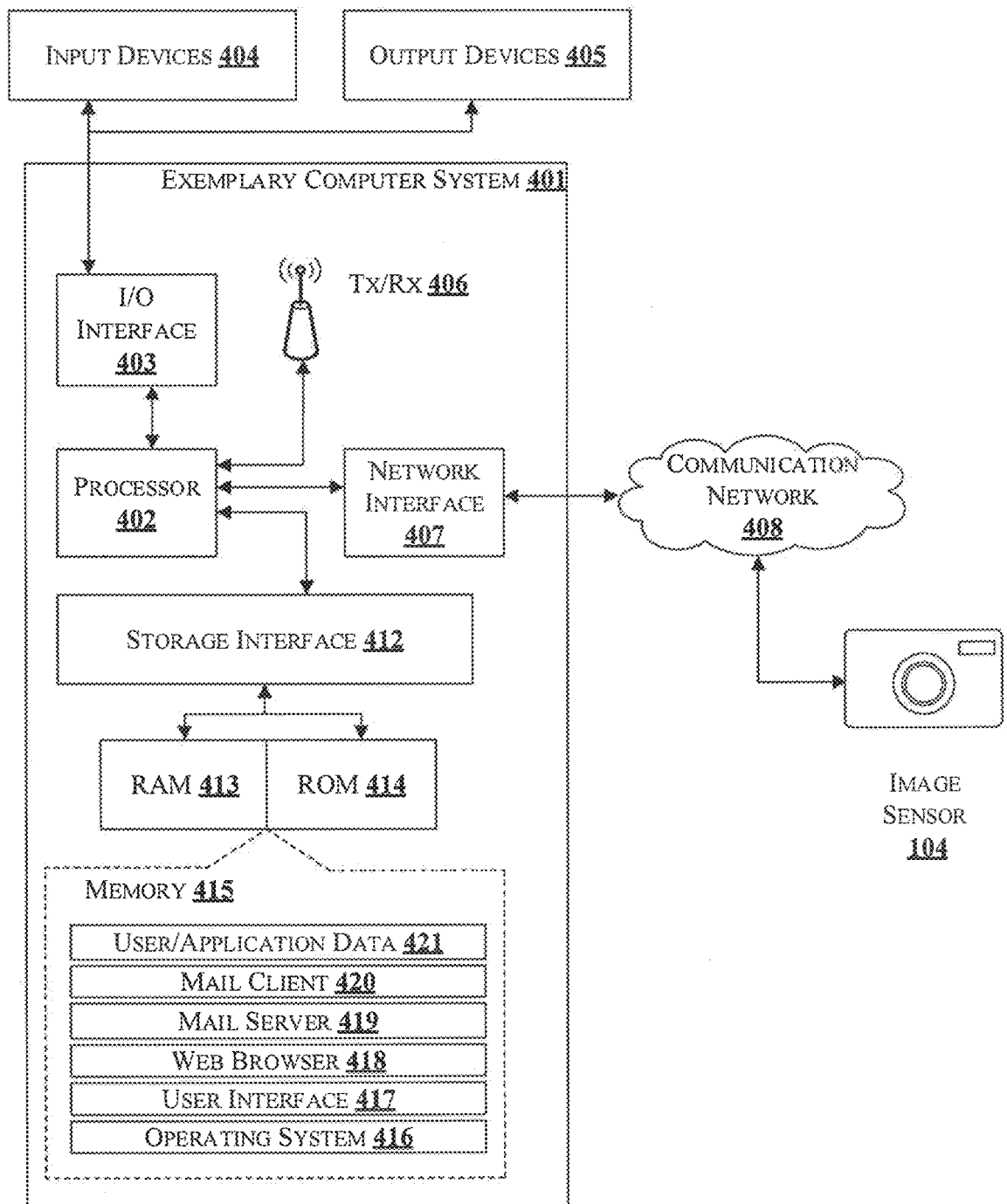
FIG. 4 illustrates a block diagram of an exemplary computer system for implementing embodiments consistent with the present disclosure.

FIG. 4 illustrates a block diagram of an exemplary computer system for implementing embodiments consistent with the present disclosure.

In an embodiment, the computer system 401 may be data recognition system 102, which is used for recognizing data in images. The computer system 401 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (404 and 405) via I/O interface 403. The I/O interface 403 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 403, the computer system 401 may communicate with one or more I/O devices (404 and 405). In some implementations, the processor 402 may be disposed in communication with a communication network 408 via a network interface 407. The network interface 407 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 407 and the communication network 408, the computer system 401 may be connected to the image sensor 104 for receiving one or more images or video stream captured by image sensor 104.

The communication network 408 can be implemented as one of the several types of networks, such as intranet or any such wireless network interfaces. The communication network 408 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 408 may include a variety of network devices, including routers, bridges, servers, computing devices, storage devices, etc.

In some embodiments, the processor 402 may be disposed in communication with a memory 415 e.g., RAM 413, and ROM 414, etc. as shown in FIG. 4, via a storage interface 412. The storage interface 412 may connect to memory 415 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 415 may store a collection of program or database components, including, without limitation, user/application 421, an operating system 416, a web browser 418, a mail client 420, a mail server 419, a user interface 417, and the like. In some embodiments, computer system 401 may store user/application data 421, such as the data, variables, records, etc. as described in this invention. Such databases may be implemented as fault-tolerant, relational, scalable, secure databases such as Oracle or Sybase.

The operating system 416 may facilitate resource management and operation of the computer system 401. Examples of operating systems include, without limitation, Apple Macintosh™ OS X™, UNIX™, Unix-like system distributions (e.g., Berkeley Software Distribution (BSD), FreeBSD™, Net BSD™, Open BSD™, etc.), Linux distributions (e.g., Red Hat™, Ubuntu™, K-Ubuntu™, etc.), International Business Machines (IBM™) OS/2 ™, Microsoft Windows™ (XP™, Vista/7/8, etc.), Apple iOS™, Google Android™, Blackberry™ Operating System (OS), or the like. A user interface may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, windows, widgets, etc. Graphical User Interfaces (GUIs) may be employed, including, without limitation, Apple™ Macintosh™ operating systems' Aqua™, IBM™ OS/2™, Microsoft™ Windows™ (e.g., Aero, Metro, etc.), Unix X-Windows™, web interface libraries (e.g., ActiveX, Java, JavaScript, AJAX, HTML, Adobe Flash, etc.), or the like.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

ADVANTAGES OF THE EMBODIMENT OF THE PRESENT DISCLOSURE ARE ILLUSTRATED HEREIN

In an embodiment, the present disclosure all the features of the images are automatically extracted from the object relationship data. Knowledge base representation is automatically updated. For a given image data, the best NN will be automatically selected by the prediction module. The prediction module will be able to select the NN even with partial input of defined features.

What is claimed is:

1. A method for recognition of data in one or more images, the method comprising:
   receiving, by a processor of a data recognition system, the one or more images from an image sensor coupled with the processor;
   segmenting, by the processor, the one or more images to identify one or more segmented objects in the one or more images;
   generating, by the processor, an object relationship data for each of the segmented objects, each of the segmented objects comprising at least one or more defined features and a confidence score;
   determining, by the processor, a knowledge base representation of the object relationship data based on the one or more defined features of the one or more segmented objects, wherein the knowledge base representation comprises one or more defined feature nodes, one or more indent nodes and a plurality of links defining a relationship between the one or more defined feature nodes and at least one indent node;
   training, by the processor, a Recurrent Neural Network (RNN) based on the knowledge base representation to generate a trained RNN; and
   determining, by the processor, an appropriate Neural Network (NN) based on selection of the at least one indent node having optimum confidence score and the trained RNN for data prediction and recognition, wherein determining the appropriate NN comprises selecting the NN by the RNN based on at least one defined feature node linked with the indent node representing the selected NN.

2. The method as claimed in claim 1, wherein segmenting the one or more images comprising, the steps of:
   identifying one or more trained objects and text data in the one or more images;
   generating, by the processor, at least one boundary for the one or more trained objects text data identified in the one or more images; and
   cropping, by the processor, the identified trained objects and text data along the at least one boundary to determine the one or more segmented objects in the one or more images.

3. The method as claimed in claim 1, wherein generating the object relationship data comprising steps of:
   training a plurality of NNs with the one or more segmented objects;
   identifying at least one defined feature for each of the one or more segmented objects; and
   determining the confidence score for the one or more defined features of one or more segmented objects associated with the plurality of NNs.

4. The method as claimed in claim 1, wherein the step of determining the knowledge base representation of the object relationship data comprising steps of:
   identifying the one or more indent nodes for each segmented object in the object relationship data, wherein an indent node represents a NN;
   determining at least one indent node with optimum confidence score associated with each segmented object; and
   mapping the at least one indent node with the one or more defined features to generate a relationship between the one or more defined feature nodes and at least one indent node, wherein a defined feature node represents a defined feature in the knowledge base representation.

5. The method as claimed in claim 1, further comprising:
   automatically updating the knowledge base representation of the object relationship data with new NN based on the one or more defined features; and
   transmitting the data predicted and recognized from the selected NN to a decision-making module for further processing.

6. A system for recognition of data in one or more images, the system comprising:
   at least one image sensor for capturing the one or more images;

a processor; and a memory, communicatively coupled with the processor, wherein the memory stores processor-executable instructions, which on execution cause the processor to:
- receive the one or more images from the image sensor;
- segment the one or more images to identify one or more segmented objects;
- generate an object relationship data for each of the segmented objects, each segmented object comprises one or more defined features and a confidence score;
- determine a knowledge base representation of the object relationship data based on the one or more defined features of the one or more segmented objects, wherein the knowledge base representation comprises the one or more defined feature nodes, one or more indent nodes and a plurality of links defining the relationship between the one or more defined feature nodes and at least one indent node;
- train a Recurrent Neural Network (RNN) based on the knowledge base representation to generate a trained RNN; and
- determine an appropriate Neural Network (NN) based on selection of the at least one indent node having optimum confidence score and the trained RNN for data prediction and recognition, wherein the processor is configured to determine the appropriate NN comprises selecting the NN by the RNN based on at least one defined feature node linked with the indent node representing the selected NN.

7. The system as claimed in claim 6, wherein the processor is configured to segment the one or more images by steps comprising:
- identifying one or more trained objects and text data in the one or more images;
- generating at least one boundary for the one or more trained objects and text data identified in the one or more images; and
- cropping the identified trained objects and text data along the at least one boundary to determine the one or more segmented objects in the one or more images.

8. The system as claimed in claim 6, wherein the processor is configured to generate the object relationship data by performing steps of:
- training a plurality of NNs with the one or more segmented objects;
- identifying at least one defined feature for each of the one or more segmented objects; and
- determining the confidence score for the one or more defined features of one or more segmented objects associated with the plurality of NNs.

9. The system as claimed in claim 6, wherein the processor is configured to determine the knowledge base representation of the object relationship data by performing steps of;
- identifying the one or more indent nodes for each segmented object in the object relationship data, wherein an indent node represents a NN;
- determining at least one indent node with optimum confidence score associated with each segmented object; and
- mapping the at least one indent node with the one or more defined features to generate a relationship between the one or more defined feature nodes and at least one indent node, wherein a defined feature node represents a defined feature in the knowledge base representation.

10. The system as claimed in claim 6, wherein the processor is further configured to:
- update the knowledge base representation of the object relationship data with new NN based on the one or more defined features automatically; and
- transmit the data predicted and recognized from the selected NN to a decision-making module for further processing.

11. A non-transitory computer readable medium including instructions stored thereon that when processed by at least one processor cause a system for recognition of data to perform acts of:
- receiving the one or more images from an image sensor coupled with the processor;
- segmenting the one or more images to identify one or more segmented objects in the one or more images;
- generating an object relationship data for each of the segmented objects, each of the segmented objects comprising at least one or more defined features and a confidence score;
- determining a knowledge base representation of the object relationship data based on the one or more defined features of the one or more segmented objects, wherein the knowledge base representation comprises one or more defined feature nodes, one or more indent nodes and a plurality of links defining a relationship between the one or more defined feature nodes and at least one indent node;
- training a Recurrent Neural Network (RNN) based on the knowledge base representation to generate a trained RNN; and
- determining an appropriate Neural Network (NN) based on selection of the at least one indent node having optimum confidence score and the trained RNN for data prediction and recognition, wherein the instructions stored thereon causes the at least one processor to determine the appropriate NN by selecting the NN by the RNN based on at least one defined feature node linked with the indent node representing the selected NN.

12. The non-transitory computer readable medium as claimed in claim 11, wherein the instructions stored thereon further causes the at least one processor to segment the one or more images by:
- identifying one or more trained objects and text data in the one or more images;
- generating at least one boundary for the one or more trained objects text data identified in the one or more images; and
- cropping the identified trained objects and text data along the at least one boundary to determine the one or more segmented objects in the one or more images.

13. The non-transitory computer readable medium as claimed in claim 11, wherein the instructions stored thereon further causes the at least one processor to generate the object relationship data by:
- training a plurality of NNs with the one or more segmented objects;
- identifying at least one defined feature for each of the one or more segmented objects; and
- determining the confidence score for the one or more defined features of one or more segmented objects associated with the plurality of NNs.

14. The non-transitory computer readable medium as claimed in claim 11, wherein the instructions stored thereon further causes the at least one processor to determine the knowledge base representation of the object relationship data by:

identifying the one or more indent nodes for each segmented object in the object relationship data, wherein an indent node represents a NN;

determining at least one indent node with optimum confidence score associated with each segmented object; and mapping the at least one indent node with the one or more defined features to generate a relationship between the one or more defined feature nodes and at least one indent node, wherein a defined feature node represents a defined feature in the knowledge base representation.

15. The non-transitory computer readable medium as claimed in claim 11, wherein the instructions stored thereon further causes the at least one processor to recognize data in one or more images by:

automatically updating the knowledge base representation of the object relationship data with new NN based on the one or more defined features; and transmitting the data predicted and recognized from the selected NN to a decision-making module for further processing.

\* \* \* \* \*